United States Patent
Rahn (12)

(10) Patent No.: US 6,453,570 B1
(45) Date of Patent: Sep. 24, 2002

(54) ELECTRICALLY DRIVEN FLOATING GYROCOMPASS

(75) Inventor: Armin Rahn, Jork (DE)

(73) Assignee: C. Plath (DE)

( * ) Notice: Subject to any disclaimer, the term of this patent is extended or adjusted under 35 U.S.C. 154(b) by 0 days.

(21) Appl. No.: 09/673,446

(22) PCT Filed: Mar. 29, 1999

(86) PCT No.: PCT/EP99/02164

§ 371 (c)(1),
(2), (4) Date: Oct. 16, 2000

(87) PCT Pub. No.: WO99/54682

PCT Pub. Date: Oct. 28, 1999

(30) Foreign Application Priority Data

Apr. 16, 1998 (DE) .......................... 198 16 924

(51) Int. Cl.[7] .............................................. G01C 19/08
(52) U.S. Cl. .............................. 33/327; 33/324; 74/5 R; 74/5.6 C
(58) Field of Search ....................... 33/327, 316, 317 R, 33/318, 319, 324; 74/5 R, 5.1, 5.22, 5.34, 5.4, 5.6 R, 5.6 C, 5.6 D, 5.6 E, 5.8, 5.9

(56) References Cited

U.S. PATENT DOCUMENTS 3,386,179 A * 6/1968 Thomaier et al. ............. 33/327
3,412,472 A * 11/1968 Annen .......................... 33/327
4,008,623 A    2/1977 Ehrich et al.
4,033,045 A *  7/1977 Wing ............................ 33/327
4,280,366 A *  7/1981 Aberg .......................... 74/5 R
4,441,375 A *  4/1984 Minohara et al. ............. 33/327
4,471,665 A *  9/1984 Hojo et al. .................... 33/327
6,131,297 A * 10/2000 Yamamoto et al. ........... 33/324

FOREIGN PATENT DOCUMENTS

GB              1121899            7/1968

OTHER PUBLICATIONS

Article: W. von Fabeck, "Kreiselgerate", Vogel–Verlag 1980, pp. 314 through 317.

* cited by examiner

Primary Examiner—Christopher W. Fulton
(74) Attorney, Agent, or Firm—Elliott N. Kramsky

(57) ABSTRACT

A gyrocompass having a capsule, mounted to float in an air-tight fashion, for at least one electrically driven gyro. The capsule is produced from two mutually adapted shells which are sealed with respect to one another and consist of a high-strength, corrosion-resistant material which is a good electrical conductor. A steel alloy, titanium alloy, or a high-strength conducting plastic material is suitable. The device avoids electrically insulated bushings on the bottom and edge sides, substantially simplifying the configuration of an equatorial azimuthal tap. The mechanical stability of the capsule is conspicuously improved, and the official HSC requirements for fast ships are readily met.

8 Claims, 2 Drawing Sheets

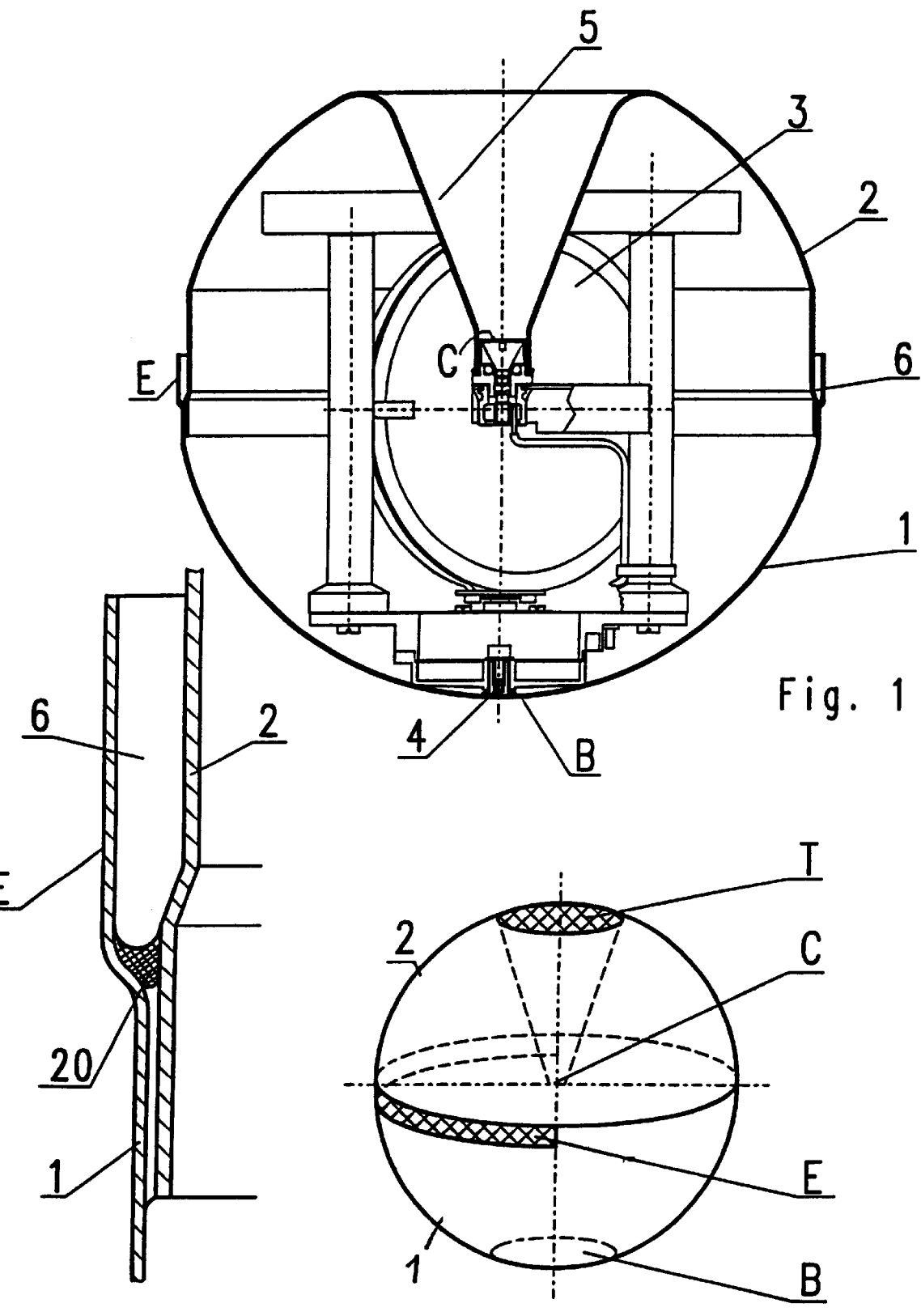

ELECTRICALLY DRIVEN FLOATING GYROCOMPASS

BACKGROUND

1. Field of the Invention

The present invention relates gyrocompasses. More particularly, this invention pertains to a gyrocompass having at least one electrically driven gyro in a gas-tight capsule mounted to float in an electrically conducting liquid inside a compass casing and supplied from an external current source through the capsule wall.

2. Description of the Prior Art

It has long been known to install one, two or more mutually mechanically-coupled, electrically-operated gyros inside a generally spherical casing or capsule to ensure storage largely free from environmental influences and exhibiting low loss and low friction. While it would be desirable to evacuate the capsule to reduce frictional losses, it is required to fill the capsule with a gas which is as light as possible, and preferably inert (e.g., with hydrogen or helium) to dissipate the heat losses unavoidably produced by the gyro drive. The capsule must, therefore, be absolutely airtight over very long periods of time (i.e., from several years to decades). Appropriate cable bushings are necessary for supplying the gyro with current, placing extreme tightness specifications on the bushings.

As it is impossible to produce a more-or-less spherical one-piece capsule, it is known to produce the capsule holding the gyro from two essentially-hemispherical shells (denoted below as "lower" and "upper" shells). The two shells are plugged together in the region of their free rims in an overlapping, and mutually adapted, fashion to form the desired spherical capsule. They are hermetically sealed to one another by means of a circumferential sealing packing.

It is known to produce the two shells from a conductive material. Aluminum has always been preferred due to its low specific weight. Since the capsule is mounted to float inside a conductive liquid within the compass casing (i.e., in an electrolyte), it is mandatory, for avoiding more-or-less rapid dissolution of the capsule casing, to provide a very thick adhesive, chemically neutral coating on the exterior of the casing. The smallest gaps, cracks or damage in or to the coating lead, sooner or later, to capsule leaks, particularly in the regions of the electric bushings and/or the equatorial joint. To insure tightness, particularly in the equatorial region of a joint between the lower and upper shells 1, 2 (compare FIG. 5), a preferably shrunk-on equatorial ring 11 of plastic is additionally provided at the exterior.

In order to determine the instantaneous azimuthal position of the gyro, it is, however, necessary to provide a conductive region that spans at least a sub-region of the equator (the so-called azimuthal tap) on the outside of the casing. Such region is formed in present-day gyrocompasses by, for example, a conductive, preferably gilded wire that circumscribes the casing equatorially. Such azimuthal tap must, however, be electrically connected (by metal of as low resistance as possible) to one pole of the gyro power supply. This has been solved to date by guiding the azimuthal tap wire that circumscribes the equatorial ring 11 inwardly, sealing it, at one point,. into the lower shell 1 and connecting it by metal to a bottom contact 10 on the underside. FIG. 5 illustrates the terminal connection 12 between the azimuthal tap and a bushing 13 that, for reasons explained above, is to be sealed in a hermetically and absolutely gas-tight fashion to a sealing packing 14 that is also compatible, particularly with regard to its coefficient of thermal expansion.

In gyrocompasses of this type, current is fed to one pole of the gyro motor(s) via a bottom contact 10 (compare FIG. 4) or from the latter to the outside via the electrically conducting liquid. The bottom contact 10 is gilded low down on the outside to insure desired, good, non-corroding contact with the surrounding conducting liquid over the long term. To avoid thermal stress problems, the body of the bottom contact 10 is preferably selected from a material adapted to the material of the lower shell 1, (i.e., aluminum) it being the case that (as FIG. 4 reveals) it presents a much more technically demanding problem, including comparatively high production costs, to fit the lower shell 1, in turn, in an absolutely airtight fashion into a corresponding cutout in the base. It is necessary in this case to insure that the outer coating of the lower shell 1 is not interrupted or damaged at any point as leaks are otherwise unavoidable after a short time. The bottom contact 10 is rigidly joined on the inside to a flange-like support 15 into the middle of which is inserted an upwardly-projecting holder 16 as bearing support for the gyro(s).

It is clear from the above that the production costs associated with the capsule that holds the gyros are substantial for a gyrocompass of this type.

SUMMARY AND OBJECTS OF THE INVENTION

It is therefore an object of the invention to simplify the structural configuration of and the production processes for a capsule for mounting the gyro(s) of a floating gyrocompass substantially.

It is another object of the invention to achieve the above object with a configuration in which the total weight of the unit, mounted to float, comprising the capsule and gyros contained therein, corresponds exactly to known units so no other changes are necessary.

The preceding and other objects are addressed by the present invention that provides a gyrocompass. Such gyrocompass includes at least one electrically driven gyro. The gyro is mounted in a gas-tight capsule supplied from an external current source through a capsule wall. The capsule is mounted to float in an electrically conducting liquid inside a compass casing.

The capsule comprises two mutually adapted shells that are sealed to one another. Each of the shells consists of a high-strength, corrosion-resistant, electrically conductive material.

Assuming that the capsule has an essentially spherical shape (not essential), it is advantageous that the capsule be formed of a lower, essentially hemispherical, shell and an upper shell with the two shell rims fitted to one another in a mutually overlapping fashion along an equatorial strip and joined in an air-tight fashion by means of a circumferential sealing packing. Since the two shells consist, according to the invention, of a high-strength, corrosion-resistant material that is a good electric conductor, the sealing external equatorial ring of shrunk-on plastic of the prior art (technically relatively complicated to produce) can be dispensed with, as there is no longer any risk of leaks due to corrosion. The technical configuration and design of the azimuthal tap is thereby rendered extraordinarily simple. To be precise, it is now possible to employ, as azimuthal tap, an equatorial strip with an uncovered surface, preferably in the overlapping rim region of the lower shell. It is thereby possible to dispense with the bushing of the azimuthal tap (illustrated in FIG. 5) on the inside of the lower shell 1, since metal contact is insured via the material of the lower shell.

An advantage which is at least just as important from the point of view of production is that, because of the use, as bottom contact, of material which is a good electric conductor but resistant to corrosion, there is no longer any need for separate components. An uncovered region of the lower shell 1 on the underside is sufficient as the bottom contact.

The foregoing and additional features of the invention will become further apparent from the detailed description that follows. Such description is accompanied by a set of drawing figures. Numerals of the drawing figures, corresponding to those of the written description, point to the features of the invention, with like numerals referring to like features throughout both the written description and the drawing figures.

BRIEF DESCRIPTION OF THE DRAWINGS

FIG. 1 is a cross-sectional view of a compass capsule according to the invention;

FIG. 2 is a simplified diagrammatic external perspective view of a compass capsule in accordance with the invention;

FIG. 3 is an enlarged partial sectional view of the equatorial joint region between an upper and a lower shell of a compass capsule in accordance with the invention;

DETAILED DESCRIPTION OF THE PREFERRED EMBODIMENT

Figure 4:
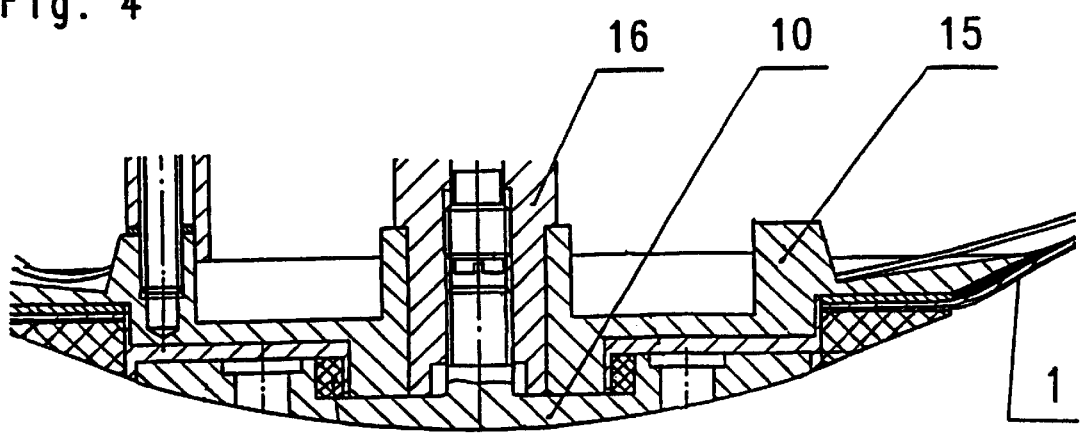
FIG. 4 is a partial sectional view of the base region of the lower shell of a compass casing in accordance with the prior art.
Figure 5:
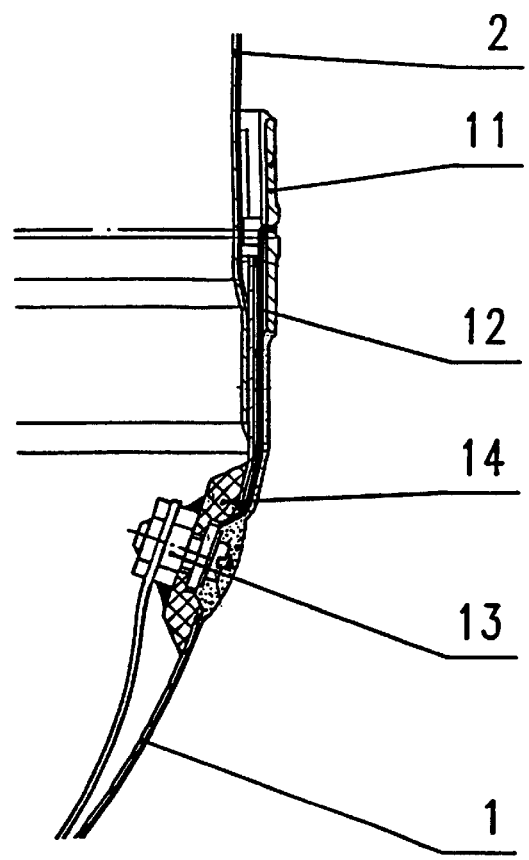
FIG. 5 illustrates the joint and the bushing in the region of the joint for a capsule assembled from two shells for protecting and holding electrically driven gyros of a gyrocompass in accordance with the prior art.

FIG. 1 is a cross-section view of the capsule of the invention. The capsule is fabricated of corrosion-resistant material which is also a good electric conductor. In a similar manner to the prior art, it comprises lower and upper, essentially hemispherical, shells 1 and 2. In the case of the upper shell 2, a funnel 5 is provided in the upper pole region that reaches as far as the center of the spherical capsule and has at its base a central contact C which, after being mounted for operation, can be sealed on the top side with a very small amount of mercury or other liquid that is a good electric conductor and into which there dips from above a contact pin which is suspended at a universal joint. (The funnel 5 and the bushing and contacting problems associated with the contact 10 are not the subject matter of the invention. Rather, as FIG. 2 illustrates, the invention is also suitable for other types of gyro capsules including, for example, those that are completely spherical.)

The two shells 1 and 2 that form the spherical capsule, fitted to one another along the equatorial plane in an overlapping fashion by means of appropriate offsets, are produced from a corrosion-resistant material which is also a good electrical conductor. Such material may comprise alloyed steels, titanium alloys and various types of conductive plastics (i.e., those enriched with carbon filling materials that are good electrical conductors). In tests, specific alloyed steels have proved to be particularly advantageous.

It would initially appear to be impossible to produce a member capable of floating by employing an alloyed steel for the capsule rather than known low specific weight aluminum. One would assume that the total weight of the compass capsule, including gyros, would thus become significantly greater and there would be no question of employing it in known compass systems. However, it has been found that it is possible, due to structural changes made possible by the use of steel as the capsule material, to save weight in the interior of the capsule, thereby permitting one to realize the advantages explained below.

Due to the choice of material in accordance with the invention, there exists no risk of corrosion and, thus, of leaks with the capsule floating in the electrolytic liquid. This permits omission of the shrunk-on plastic equatorial ring. In accordance with an embodiment of the invention, it is possible to make direct use of an equatorially circumferential strip-like uncovered region E on the upper outer rim of the lower capsule 1 as an azimuthal tap. The requirements of a gilded wire, a conducting bushing and the like are thereby avoided.

Even more significant are the advantages at the region of the bottom contact B. Here, direct use is made of an uncovered region of the material on the shell 1 as bottom contact region B. As a result, the bushing and sealing problems explained with reference to FIG. 4, as well as the need for a gilded bottom contact 10, are eliminated.

Due to the use of material that is substantially stronger and more stable than aluminum, it is possible, as illustrated in FIG. 1, to simplify the design on an inner, frame-like support for mounting the gyro(s) 3. Contact-making and mounting are performed solely by means of a screw that is screwed into a threaded nipple 4 welded on the inside in the lower pole region of the lower shell 1. The joint between the strip E of the azimuthal tap and the lower bottom contact B is accomplished with metal and with a low resistance directly above the lower shell 1.

As may be seen from FIG. 3, the upper shell 2 is fitted in an overlapping fashion to the lower shell 1 in a known way and hermetically sealed by means of a circumferential sealing compound 20. A circumferential trough 6 may be employed in a known way to insert balancing weights along the circumference.

If, as can be seen in FIG. 2, a capsule is provided without the funnel 5, a contact T can be formed on the top side directly by the material of the upper shell 2 in the same way that the bottom contact B is formed by an uncovered region. As shown in FIG. 3, the two shells 1 and 2 are electrically insulated from one another. The capsule formed from the shells can be provided with an insulating coating with the regions for the azimuthal tap E and the bottom contact or the top-side contact T remaining uncovered (i.e., left without a protective coating). Of course, it is possible for the external protective coating, no longer required for protection against corrosion, to be eliminated entirely. This is recommended, in particular, whenever another method, such as optical tapping, is provided for the azimuthal tap.

Trials have shown that, despite the use of materials of higher specific weight for a compass capsule that is capable of floatation due to gyro bearing simplification, essentially the same overall weight can be achieved in the interior as in the known gyrocompass as described above. As a result, modules can be directly exchanged, even in the case of the many gyrocompasses already employing the design under discussion.

Disregarding the substantial savings in production cost, the invention delivers another range of technical advantages that are summarized below without any claim to completeness:

The number of parts required is substantially reduced (e.g., from approximately thirteen to four);

The number of different materials coming into contact with the electrolytic liquid in the compass casing is substantially reduced (e.g. from approximately eight to approximately three);

The number of possible fluid leakage points on the casing is substantially reduced since bushings are omitted;

The material of the capsule is substantially more corrosion-resistant in comparison to known capsule materials;

The mechanical stability of the capsule is improved, indirectly resulting in the possibility of higher production accuracies; and The higher accuracy required for ever faster ships, so-called HSC performance, can be effectively achieved due to the conspicuously increased stability of the capsule.

While the invention has been disclosed with reference to its presently-preferred embodiment, it is not limited thereto. Rather, the invention is limited only insofar as it is defined by the following set of patent claims and includes within its scope all equivalents thereof.

What is claimed is:

1. A gyrocompass comprising, in combination:
   a) at least one electrically driven gyro;
   b) said gyro being mounted in a gas-tight capsule and supplied from an external current source through a capsule wall;
   c) said capsule being mounted to float in an electrically conducting liquid inside a compass casing;
   d) said capsule comprising two mutually adapted shells which are sealed with respect to one another; and
   e) each of said shells consisting of a high-strength, corrosion-resistant electrically-conductive material.

2. A gyrocompass as defined in claim 1 further comprising:
   a) said capsule being formed by a lower, substantially hemispherical shell and an upper shell; and
   b) said two shell rims being fitted to one another in a mutually overlapping fashion along an equatorial strip and joined in an air-tight fashion by means of a circumferential sealing packing.

3. A gyrocompass as defined in claim 2 further including:
   a) said upper circumferential free rim of said hemispherical lower shell overlapping said upper shell on the outside; and
   b) a free, electrically conducting contact strip formed directly by the shell material and extending over at least a portion of the equatorial shell circumference on the outside in the region of the equator.

4. A gyrocompass as defined in claim 2 or 3 further including an external bottom contact region formed directly by uncovered shell material in a lower pole region of said lower shell.

5. A gyrocompass as defined in claim 2 further including an external upper contact region formed directly by uncovered shell material on said upper shell.

6. A gyrocompass as defined in claim 1 wherein said two shells comprise a steel alloy which is corrosion-resistant with respect to chemically aggressive media.

7. A gyrocompass as defined in claim 1, wherein said two shells are of a titanium alloy.

8. A gyrocompass as defined in claim 1, wherein said two shells are of a high-strength, conductive plastic material.

* * * * *